United States Patent

[11] 3,621,041

[72] Inventors Russell Kwok;
  Albert Pohland, both of Indianapolis, Ind.
[21] Appl. No. 742,481
[22] Filed July 5, 1968
[45] Patented Nov. 16, 1971
[73] Assignee Eli Lilly and Company
  Indianapolis, Ind.

[54] CHROMANS
  1 Claim, No Drawings
[52] U.S. Cl. .................................................. 260/345.2,
  260/289, 260/279, 260/999
[51] Int. Cl. ....................................................... C07d 7/20
[50] Field of Search ............................................. 260/345.2

[56] References Cited
  OTHER REFERENCES
Chatterjea et al., Ber., vol. 96, pp. 2356–61 (1963)

*Primary Examiner*—John M. Ford
*Attorneys*—Everet F. Smith and Walter E. Buting ABSTRACT: Des-N-methyldihydroacronycine and analogs thereof and a process for the preparation thereof comprising (1) halogenating a 7-alkoxy-2,2-dialkylchroman to the 6-halo derivative, (2) converting the b-halo derivative to the 5-amino-substituted chroman with sodium amide in liquid ammonia, (3) condensing the amine with an o-halobenzoic acid to yield the 2-carboxyanilino derivative and (4) cyclizing the carboxyanilino compound to the des-N-methyl-dihydroacronycine with polyphosphoric acid. Des-N-methyl-dihydroacronycine can be converted to acronycine, a known antitumor agent.

CHROMANS

BACKGROUND OF THE INVENTION

Acronycine was first isolated from *Acronychia baueri* by Lahey and coworkers [Nature, 162, 223 (1948) and Aust. J. Sci. Res., A2, 423 (1949)]. In 1966, MacDonald and Robertson, Aust. J. Chem., 19, 275 (1966), and Govindachari, Pai, and Subramaniam, Tetrahedron, 22, 3245 (1966) determined that acronycine has the following structure:

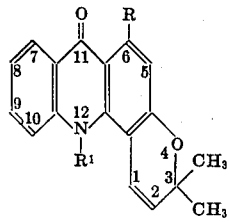

wherein R is methoxy and R' is methyl.

In addition, Govindachari et al. isolated noracronycine which differs from acronycine in that R in the above formula is hydroxy; des-N-methylacronycine, in which R' is hydrogen; and des-N-methylnoracronycine, in which R is hydroxy and R' is hydrogen.

The synthesis of acronycine from noracronycine is described in Aust. J. Sci. Res., A2, 622 (1949).

Recently, it was found by Svoboda and coworkers [J. Pharm. Sci., 55, 758 (1966) and Lloydia, 29, 206 (1966)] that acronycine has an extremely powerful antitumor action against transplanted tumors in mice, particularly against Shionogi carcinoma, C-1498 myelogenous leukemia, Mecca lymphosarcoma, and X-5563 plasma cell myeloma.

SUMMARY

The present invention relates to des-N-methyldihydroacronycine and its analogs and to a novel process for the manufacture thereof. The compounds of the invention are represented by the formula

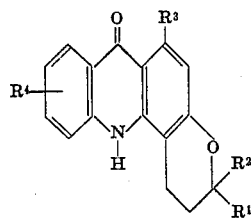

wherein $R^1$ and $R^2$ are hydrogen or $C_1$-$C_4$ alkyl, $R^3$ is $C_1$-$C_4$ alkoxy or benzyloxy, $R^4$ is hydrogen, $C_1$-$C_4$ alkyl, $C_1$-$C_4$ alkoxy, fluoro, chloro, bromo, nitro or trifluoromethyl. The term "$C_1$-$C_4$ alkyl" as employed herein is intended to include both straight and branched chained alkyl groups, as for example, methyl, ethyl, n-propyl, isopropyl, n-butyl, sec-butyl, isobutyl and tert-butyl. The term "$C_1$-$C_4$ alkoxy" as used herein is intended to include both the straight and branched chained alkyl groups, defined above, attached to an oxygen atom, as for example, methoxy, ethoxy, n-propoxy, isopropoxy, n-butoxy, isobutoxy, sec-butoxy and tert-butoxy.

The novel process of this invention proceeds through a reaction sequence which involves, initially, the halogenation of a 7-alkoxy-2,2-dialkylchroman to yield the corresponding 6-halo-chroman. Amination of the 6-halo-7-alkoxy-2,2-dialkylchroman with an alkali metal amide in liquid ammonia affords the 5-amino-7-alkoxy-2,2-dialkylchroman, rather than the expected 6-amino compound. Condensation of the 5-aminochroman with an o-halobenzoic acid under the conditions of the Jourdan-Ullmann reaction yields a 5-(2-carboxyanilino)-7-alkoxy-2,2-dialkylchroman. The latter compound, when heated in the presence of polyphosphoric acid, undergoes an intramolecular cyclization to form the desired des-N-methyldihydroacronycine.

When the starting material in the present process is 7-methoxy-2,2-dimethylchroman, halogenation and amination yield 5-amino-7-methoxy-2,2-dimethylchroman. Condensation of this amine derivative with an o-halobenzoic acid, followed by cyclization is the presence of polyphosphoric acid yields des-N-methyldihydroacronycine.

DETAILED DESCRIPTION

The starting material for the synthesis of the compounds of this invention is a 7-alkoxy-2,2-dialkylchroman represented by the formula

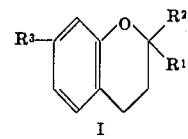

I wherein $R^1$, $R^2$ and $R^3$ have the same meaning as hereinabove. The term alkoxy as used herein is intended to include benzyloxy as well as $C_1$-$C_4$ alkoxy as defined above.

The starting chroman (I) is prepared from a 7-hydroxy-2,2-dialkyl-4-chromanone which can be obtained by the procedure of Masateru Miyano and Masanao Matsui, Bull. Chem. Soc. Japan, 31, 397–402 (1958). In accordance with this procedure, resorcinol is reacted with an appropriately substituted acrylic acid to yield a substituted chromanone of the formula

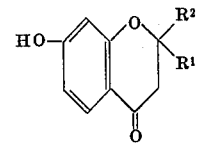

wherein $R^1$ and $R^2$ have the same meaning as hereinabove.

Etherification by any of the methods commonly used for the formation of phenolic ethers yields the corresponding 7-alkoxy-2,2-dialkyl-4-chromanone. For example, the 7-hydroxy-4-chromanone is reacted with an alkyl halide such as methyl iodide or a benzyl halide such as benzyl chloride in the presence of potassium carbonate in a refluxing solvent such as acetone to yield the corresponding ether of the 4-chromanone. Etherification of the 7-hydroxy-4-chromanone can also be effected by reaction with a diazoalkane such as diazomethane or diazoethane in a suitable solvent. Still another method of etherifying the 4-chromanone involves the reaction of the phenol with a dialkyl ester of sulfuric acid in the presence of sodium hydroxide.

The 7-alkoxy-2,2-dialkyl-4-chromanone thus prepared is converted into the corresponding chroman by either of two methods. In the first of these, the 4-chromanone is reduced with lithium aluminum hydride in refluxing ether to yield the corresponding 4-chromanol. The 4-chromanol is dehydrated in the presence of phosphorus oxychloride and pyridine in refluxing benzene to yield a 7-alkoxy-2,2-dialkyl-2H-chromene. Catalytic hydrogenation of the chromene affords the chroman. The hydrogenation can be carried out in ethanol under a hydrogen pressure of 40 p.s.i.g. at room temperature in the presence of Raney nickel.

Alternatively, the chroman can be prepared from the 7-alkoxy-2,2-dialkyl-4-chromanone directly by high-pressure, high-temperature hydrogenation in the presence of a copper chromite catalyst. The hydrogenation can be carried out in a high-pressure rocking autoclave under a hydrogen pressure of about 2,000 to about 4,000 p.s.i.g. at a temperature of about 200° to about 300° C. Under these conditions of temperature and pressure, the reduction proceeds to yield the chroman within three hours. The hydrogenation is conveniently carried out without a solvent if desired; however, solvents such as dioxane and ethanol, which are compatible with the copper chromite catalyst and the conditions of the hydrogenation, can be used. The high-pressure technique and the copper chromite catalyst employed in the above one-step reduction are described by Homer B. Adkins, "Reaction of Hydrogen with Organic Compounds over Copper Chromium Oxide and Nickel Catalysts." University of Wisconsin Press, 1937.

It should be noted that the one-step high-pressure method of preparing the chroman cannot be employed when $R^3$ is benzyloxy, since the hydrogenation conditions described would result in O-debenzylation in the 7-position.

As previously noted, the first step in the present process for the synthesis of des-N-methyldihydroacronycine and analogs thereof involves the halogenation of a chroman (I) to yield a 6-halochroman (II).

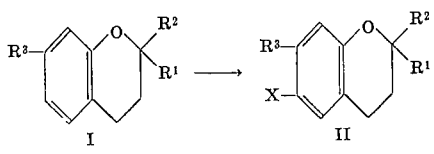

In the above formulas, $R^1$, $R^2$ and $R^3$ have the same meaning as hereinabove and X is chloro or bromo. The halogenation is preferably carried out with chlorine or bromine at a reaction temperature between about −5° and about 30° C. in the presence of an inert solvent such as chloroform, ethylene dichloride, carbon tetrachloride or the like. When chlorine is the halogenating agent, chlorine gas is allowed to bubble slowly through a solution of the chroman at room temperature. When bromine is the halogenating agent, a solution of bromine in one of the indicated solvents is added dropwise to a solution of the chroman, preferably in the same solvent. In a preferred embodiment, a carbon tetrachloride solution of bromine is cooled to 0° C. and added slowly by dropwise addition to a cooled (0° C.) carbon tetrachloride solution of the chroman. The reaction mixture is thereafter allowed to warm to room temperature, and the product is isolated according to procedures known in the art. The product is generally purified by distillation.

The 6-halochroman thus obtained is caused to react with an alkali metal amide in liquid ammonia. The 6-halo substituent is lost, amination occuring in the 5-position to yield a 5-aminochroman according to the following reaction scheme:

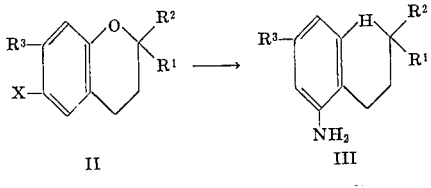

wherein $R^1$, $R^2$, $R^3$ and X have the same meaning as hereinabove. Sodium amide and potassium amide in liquid ammonia are particularly effective aminating agents. A preferred method of preparing the 5-aminochroman involves reacting sodium amide with the 6-halochroman in liquid ammonia to yield the 5-amino compound as the sole aminated product. The amination is customarily carried out at a reaction temperature between about −75° and −33° C. and is usually complete at the end of 3 to 4 hours.

The amination method described above is especially advantageous in the present process, since alternate methods for the introduction of the amino substituent into the chroman nucleus produce position isomers which are not suitable for the preparation of des-N-methyldihydroacronycine.

The 5-aminochromans and the pharmaceutically acceptable nontoxic salts thereof, in addition to being useful as intermediates in the synthesis of acronycine and its analogs, are also useful as mild central nervous system depressants in warm-blooded animals.

The novel 6-chloro- and 6-bromochromans of this invention are particularly valuable as synthetic precursors of the 5-aminochromans. As such they are key intermediates in the present novel process for the synthesis of acronycine and its analogs.

Reaction of the 5-aminochroman (III) under the conditions of the Jourdan-Ullmann Reaction with an ortho-halobenzoic acid in the presence of copper powder yields the 5-(2-carboxyanilino)chroman of the formula

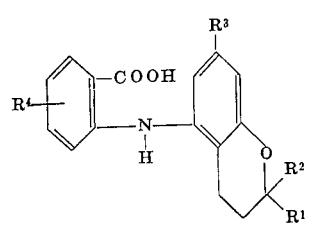

wherein $R^1$, $R^2$, $R^3$ and $R^4$ have the same meaning as hereinabove. The required halobenzoic acid intermediates for this step of the process are readily available either from commercial sources or by methods of the art. 2-Bromobenzoic acid, 2-chloro-5-fluorobenzoic acid, 2-bromo-4-methylbenzoic acid, 2-chloro-5-nitrobenzoic acid, 2-bromo-5-trifluoromethylbenzoic acid, 2-iodo-5-ethylbenzoic acid and 2-bromo-4-methoxybenzoic acid are illustrative of the ortho-halobenzoic acids which can be employed in the present invention to yield the corresponding 5-(2-carboxyanilino)chromans.

The preparation of the desired 5-(2-carboxyanilino)chroman is preferably carried out in an inert solvent. Ethers such as diethyl ether, dipropyl ether, dioxane, tetrahydrofuran and the like, alcohols such as methanol, ethanol, n-butanol, n-amyl alcohol, isoamyl alcohol and the like and other inert solvents commonly used in the Ullmann reaction can be employed in the present description. The reaction temperature employed in the present description. The reaction temperature employed is conveniently the reflux temperature of the solvent. Some form of finely divided copper or cuprous salt is employed as a catalyst and a hydrogen halide acceptor is also desirably added to the reaction mixture for best results. The reaction conditions for the Ullmann reaction are described in greater detail by R. M. Acheson, Acridines, The Chemistry of Heterocyclic Compounds, Interscience Publishers, Inc., New York, 1956.

A preferred method for the preparation of the 5-(2-carboxyanilino)chroman (IV) utilizes n-amyl alcohol as the solvent, and is carried out at reflux temperature in the presence of spongy copper, with excess potassium carbonate as the hydrogen halide acceptor. Small amounts of cupric carbonate added to the reaction mixture appear to enhance the yield of the 5-(2-carboxyanilino)chroman. The reaction is advantageously conducted for about 48 hours, although satisfactory yields may be obtained with longer or shorter reaction times.

The 5-(2-carboxyanilino)chroman is separated from the reaction mixture by conventional isolation techniques and is advantageously used in the next step of the reaction sequence without further purification.

The 5-(2-carboxyanilino)chroman undergoes an intramolecular cyclization to yield a pyranoacridinone as illustrated in the following equation:

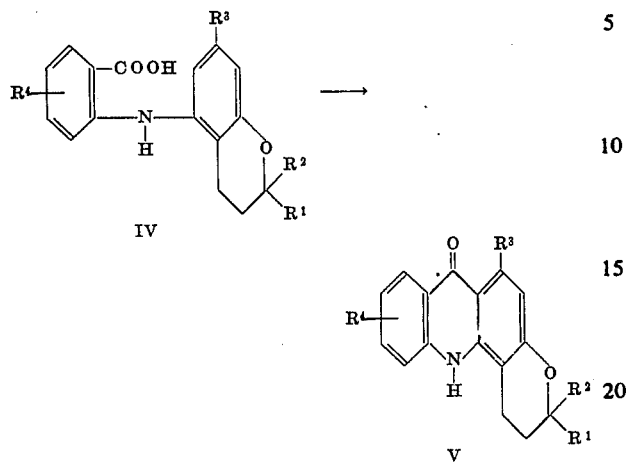

The cyclization is carried out by heating the 5-(2-carboxyanilino)chroman under acidic conditions at a temperature of about 50₀ to about 150₀ C. In a preferred method, the 5-(2-carboxyanilino)chroman is heated with polyphosphoric acid at a temperature of about 50° to about 150° C. for 2 hours to yield the 6-alkoxy-3,3-dialkyl-2,3-dihydro-7(12H)-1H-pyrano[2,3-C] acridinone.

When $R^1$ and $R^2$ are methyl, $R^3$ is methoxy and $R^4$ is hydrogen, the compound of formula V is des-N-methyl-dihydroacronycine, which can be converted to acronycine as follows: Des-N-methyl-dihydroacronycine is alkylated by reaction with methyl iodide in refluxing acetone in the presence of anhydrous potassium carbonate to yield dihydroacronycine as described by R. D. Brown and coworkers, Australian J. Sci. Research, A2, 622 (1949). O-demethylation at the 6-position of dihydrocaronycine by heating the hydrochloride salt of dihydroacronycine produces nordihydroacronycine. The reaction of nordihydroacronycine with 2,3-dichloro-5,6-dicyanoquinone (DDQ) in refluxing toluene yields noracronycine as described in the copending application of J. R. Beck and A. Pohland, Ser. No. 653,667, filed July 17, 1967. Treatment of noracronycine with dimethyl sulfate in refluxing acetone effects O-methylation of the 6-hydroxyl group to yield acronycine.

When $R^1$ and $R^2$ are groups other than methyl, or when $R^3$ is a group other than methoxyl, or when $R^4$ is a group other than hydrogen, compound V can be converted by the same sequence of reactions into the corresponding analogs of acronycine. The process of the present invention thus provides a useful method for the preparation of analogs of the known antitumor agent acronycine, as well as of acronycine itself.

The novel 5-(2-carboxyanilino)chromans are useful intermediates for the synthesis of the pyranoacridinones in the instant process. The pyranoacridinones, represented by formula V, in addition to their utility in the synthesis of acronycine and its analogs are also useful intermediates for the preparation of anthraquinone vat dyes. For example, the pyranoacridinones can be condensed with phthalic anhydride under mild Friedel-Crafts conditions to yield the 2-carboxybenzoyl derivatives, which can be cyclized in the presence of an acid catalyst, such as sulfuric acid or polyphosphoric acid, to the acridinone substituted anthraquinone.

The following illustrative examples describe more fully the practice of the present invention.

PREPARATION OF STARTING MATERIALS

7-Methoxy-2,2-dimethyl-4-chromanone. One hundred grams of 7-hydroxy-2,2-dimethyl-4-chromanone were heated under reflux for four hours with 150 ml. of methyl iodide in one liter of acetone in the presence of 75 g. of anhydrous potassium carbonate. The reaction product mixture was filtered and the filtrate was evaporated in vacuo to remove the solvent and yield a residue containing 7-methoxy-2,2-dimethyl-4-chromanone formed in the reaction. The residue was extracted with 1,000 ml. of ether, and the extract was washed with 250 ml. of 2N sodium hydroxide and with water. The extract was dried and evaporated in vacuo to yield crystalline 7-methoxy-2,2-dimethyl-4-chromanone, melting at about 82° C. after recrystallization from hexane.

Analysis—Calculated: C, 69,88; H, 6.84
Found: C, 70,08; H, 6.94

Method A

7-Methoxy-2,2-dimethyl-2H-chromene. A solution of 90 grams of 7-methoxy-2,2-dimethyl-4-chromanone in one liter of anhydrous ether was added slowly to a stirred mixture of 26 g. of lithium aluminum hydride and 500 ml. of anhydrous ether and the reaction mixture was refluxed overnight. The reaction product mixture was cooled, ethyl acetate was cautiously added until hydrogen evolution ceased, and then 500 ml. of water were slowly added. The ether layer was separated and dried, and the ether was evaporated in vacuo to yield 85 g. of 7-methoxy-2,2-dimethyl-4-chromanol as a viscous oil. The 4-chromanol so obtained was dissolved in 500 ml. of benzene and the solution was added to a mixture of 42 ml. of phosphorus oxychloride, 250 ml. of pyridine, and 300 ml. of benzene. The reaction mixture was stirred and heated at a temperature of about 85° C. for 1 hour, poured into ice water and extracted with 800 ml. of ether. The extract was washed successively with 200 ml. of 6N hydrochloric acid, 500 ml. of a 10 percent solution of sodium bicarbonate, and water. The washed extract was dried and evaporated in vacuo to yield 67 g. of 7-methoxy-2,2-dimethyl-2H-chromene as a colorless oil; b.p. 85°–88° C. at 0.5 mm. Hg; $N_D^{25}$ 1.5541.

Analysis—Calculated: C, 75,76; H, 7.42
Found: C, 75.97; H, 7.37

7-Methoxy-2,2-dimethylchroman. Forty-eight grams of 7-methoxy-2,2-dimethyl-2H-chromene were dissolved in 150 ml. of ethanol and hydrogenated over 10 g. of Raney nickel catalyst under an initial hydrogen pressure of 50 p.s.i. at a temperature of about 25° C. Hydrogen uptake was complete in 1 hour. The catalyst was removed by filtration and the filtrate was evaporated in vacuo to yield 7-methoxy-2,2-dimethylchroman as an oil. Vacuum distillation of the oil yielded 40 g. of purified material; b.p. 72° C. at 0.3 mm. Hg.

Method B

7-Methoxy-2,2-dimethylchroman. Eighty grams of 7-methoxy-2,2-dimethyl-4-chromanone and 35 g. of copper chromite hydrogenation catalyst were placed in a 500 ml. high-pressure rocking autoclave which was pressurized to 3,000 p.s.i. with hydrogen gas after charging. The autoclave and contents were heated to 200° C. and maintained at that temperature for 45 minutes with continuous agitation. The autoclave was allowed to cool to room temperature, vented, and dismantled. The crude product and catalyst were washed from the autoclave with 200 ml. of ethanol. The catalyst was removed by filtration and the ethanol was removed from the filtrate by evaporation under reduced pressure. The residue was distilled in vacuo to yield 50 g. of purified 7-methoxy-2,2-dimethylchroman, b.p. 72° C./0.3 mm. Hg; $N_D^{25}$ 1.5312.

Analysis—Calculated: C, 74.96; H, 8.38
Found: C, 75.07; H, 8.40

EXAMPLE I

Preparation of 6-bromo-7-methoxy-2,2-dimethylchroman.
A solution of 20.8 g. of bromine in 100 ml. of carbon tetrachloride was slowly added at a temperature of about 0° C. to a stirred solution of 25 g. of 7-methoxy-2,2-dimethylchroman in 200 ml. of carbon tetrachloride. The reaction mixture was allowed to stand at a temperature of 25° C. for 1 hour, after which it was washed with 200 ml. of a 20 percent solution of sodium bicarbonate in water. The washed reaction mixture was dried and evaporated in vacuo to yield an oil. Vacuum distillation of the oil yielded 33 g. of 6-bromo-7-methoxy-2,2-dimethylchroman, b.p. 140° C. at 0.3 mm. Hg. The distilled oil solidified on standing and melted at about 39°–41 C.

Analysis—Calculated: Br, 29.47
Found: Br, 29.74

Preparation of 5-amino-7-methoxy-2,2-dimethylchroman.

6-Bromo-7-methoxy-2,2-dimethylchroman (75.4 g.) was stirred for four hours with 25 g. of sodium amide in 750 ml. of liquid ammonia. Solid ammonium chloride (34 g.) was added portionwise to the reaction product mixture to decompose the sodium amide, and the ammonia was allowed to evaporate. One liter of benzene was added to the residue and evaporated in vacuo to remove residual ammonia. The residue was extracted with one liter of ether, and the extract was treated with gaseous hydrogen chloride to precipitate the hydrochloride of 5-amino-7-methoxy-2,2-dimethylchroman. The precipitated salt was filtered off and recrystallized from ethanol-ether to yield 40 g. of colorless crystals melting at about 255°–258° C. The salt was reacted with aqueous sodium hydroxide to obtain 5-amino-7-methoxy-2,2-dimethylchroman as the free base melting at 67°–68° C. after recrystallization from hexane.

Analysis—Calculated: N, 6.76
Found: N, 6.98

Preparation of des-N-methyldihydroacronycine

A mixture of 38 g. of 5-amino-7-methoxy-2,2-dimethylchroman, 38 g. of o-iodobenzoic acid, 13 g. of potassium carbonate, 9 g. of spongy copper, and 3.2 g. of copper carbonate in one liter of n-amyl alcohol was refluxed with stirring for 48 hours. The reaction product mixture was cooled and diluted with 200 ml. of water, and the n-amyl alcohol was removed by steam distillation. The remaining mixture was filtered while hot, cooled, and washed with ether to remove unreacted starting material. The aqueous mixture was acidified with 150 ml. of 6N hydrochloric acid and extracted with 600 ml. of chloroform. The chloroform extract was dried and evaporated in vacuo to yield crude 5-(2-carboxyanilino)-7-methoxy-2,2-dimethylchroman as a brown residue which was heated with 100 ml. of polyphosphoric acid for 2 hours at a temperature of about 90° C. and then poured into crushed ice. The resulting yellow solid was filtered off and washed with water. The crude product, des-N-methyldihydroacronycine, was recrystallized three times from acetone to yield 3.5 g. of pale yellow crystals melting at about 297°–299° C.

Analysis—Calculated: C, 73.77; H, 6.19; N, 4.53
Found: C, 74.06; H, 6.19; N, 4.57

Infrared, ultraviolet and nuclear magnetic resonance spectra were in agreement with the proposed structure.

EXAMPLE II

Following the reaction procedure of example I, reaction of 7-ethoxy-2-ethyl-2-methylchroman with bromine affords 6-bromo-7-ethoxy-2-ethyl-2-methylchroman. Amination of the 6-bromo derivative with sodium amide in liquid ammonia yields 5-amino-7-ethoxy-2-ethyl-2-methylchroman which, on condensation with 2-bromo-5-nitrobenzoic acid, yields 5-(4-nitro-a-carboxyanilino)-7-ethoxy-2-ethyl-2-methylchroman. Heating the anilino derivative in the presence of polyphosphoric acid affords 6-ethoxy-3-ethyl-3-methyl-2,3-dihydro-10-nitro-7(12H)-1H-pyrano[2,3-C]acridinone.

EXAMPLE III

Following the reaction procedures of example I, reaction of 7-methoxy-2,2-diethylchroman with bromine yields 6-bromo-7-methoxy-2,2-diethylchroman. Amination of the 6-bromo derivative with sodium amide in liquid ammonia affords 5-amino-7-methoxy-2,2-diethylchroman which, on condensation with 5-chloro-2-isodobenzoic acid yields 5-(4-chloro-2-carboxyanilino)-7-methoxy-2,2-diethylchroman. Heating the anilino derivative in the presence of polyphosphoric acid yields 6-methoxy-10-chloro-3,3-diethyl-2,3-dihydro-7(12H)-1H-pyrano[2,3-C]acridinone.

We claim:
1. A compound of the formula

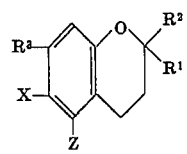

wherein $R^1$ and $R^2$ are hydrogen or $C_1$–$C_4$ alkyl, $R^3$ is $C_1$–$C_4$ alkoxy or benzyloxy, X is hydrogen, chloro or bromo, Z is hydrogen, amino or Ser. No. 742,481

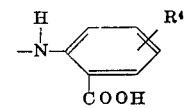

wherein $R^4$ is a substituent in the 4 or 5 position and is hydrogen, $C_1$–$C_4$ alkyl, $C_1$–$C_4$ alkoxy, fluoro, chloro, bromo, nitro or trifluoromethyl, such that when Z is hydrogen, X is chloro or bromo, and when X is hydrogen, Z is amino or

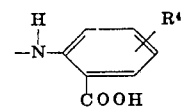

with the limitation that one of X or Z must be hydrogen.

* * * * *